United States Patent [19]

Bresser et al.

[11] Patent Number: 5,474,592
[45] Date of Patent: Dec. 12, 1995

[54] METHOD OF REPROCESSING METALLURGICAL RESIDUES, WHICH CONTAIN ZINC AND LEAD

[75] Inventors: Wolfgang Bresser, Grossostheim; Martin Hirsch, Friedrichsdorf; Albert Kaune, Oberhöchstadt; Uwe Härter, Dinslaken, all of Germany

[73] Assignee: Metallgesellschaft Aktiengesellschaft, Frankfurt am Main, Germany

[21] Appl. No.: 250,808

[22] Filed: May 27, 1994

[30] Foreign Application Priority Data

May 27, 1993 [DE] Germany .......................... 43 17 578.3

[51] Int. Cl.⁶ ....................................................... C22B 7/00
[52] U.S. Cl. .................. 75/665; 75/694; 75/961; 75/962; 423/97; 423/108; 423/623; 423/DIG. 16
[58] Field of Search .............................. 75/665, 694, 961, 75/962; 423/97, 108, 623, DIG. 16

[56] References Cited

U.S. PATENT DOCUMENTS 5,162,107  11/1992  Hirsch et al. .

FOREIGN PATENT DOCUMENTS

0434120A1  11/1990  European Pat. Off. .
434120     6/1991   European Pat. Off. .............. 75/961
2373612    7/1978   France .
1056157    4/1959   Germany .

OTHER PUBLICATIONS

Steel Times Incorporating Iron & Steel, 220 (1992) Mar., No. 3, Redhill, Surrey, GB; pp. S19–S21; Kaune et al; "Fludised bed treatment of steelplant dust".
Metallurgical Plant and Technology Int 14 1991, 3, pp. 28–32.

*Primary Examiner*—Melvyn Andrews
*Attorney, Agent, or Firm*—Herbert Dubno; Jonathan Myers

[57] ABSTRACT

Residual metallurgical materials which contain zinc and lead are reprocessed by a thermal treatment in a circulating fluidized bed. The required heat is generated in that solid carbon is combusted in the fluidized bed reactor of the circulating fluidized bed. A solid carbon content of 5 to 30% is maintained in the lower part of the fluidized bed. Oxygen-containing gases are supplied to the upper part of the fluidized bed reactor, and $CO_2$ is formed only in such an amount that zinc metal will not be reoxidized. Substantially all solids are removed from the discharged suspension in a recycle cyclone and are recycled. The gas is cooled to a temperature at which zinc metal is oxidized to ZnO. The dustlike compounds of zinc and lead are separated from the gas.

6 Claims, 1 Drawing Sheet

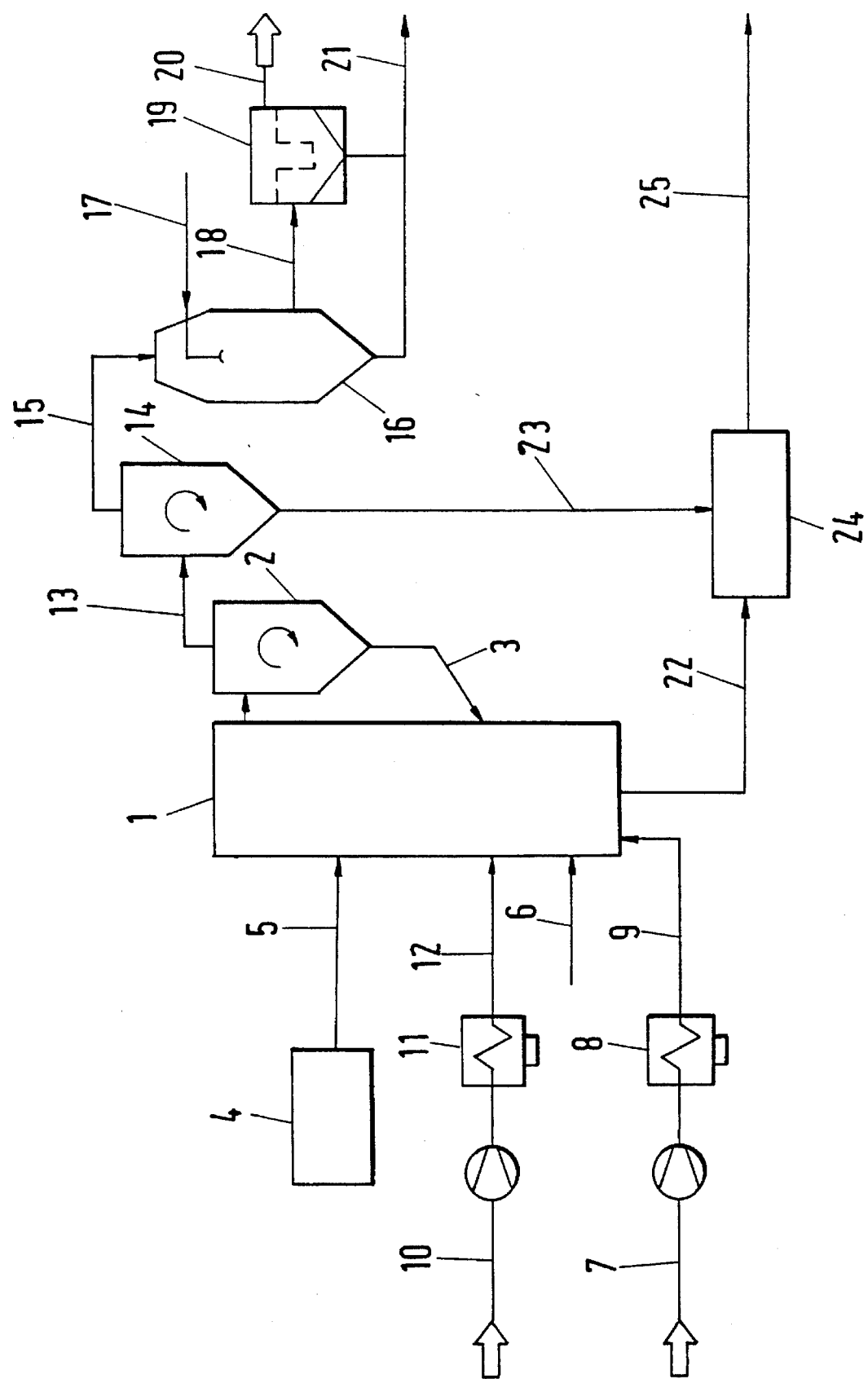

METHOD OF REPROCESSING METALLURGICAL RESIDUES, WHICH CONTAIN ZINC AND LEAD

FIELD OF THE INVENTION

The present invention relates to a method of reprocessing metallurgical residues which contain zinc and lead by a thermal treatment in a circulating fluidized bed at elevated temperatures and under reducing conditions, wherein zinc and lead are volatilized, higher oxides of iron are reduced no further than to FeO, and vaporized zinc and lead are separated from the exhaust gas after it has been cooled.

BACKGROUND OF THE INVENTION

In the production of hot metal or pig iron and steel, residues consisting of dusts and sludges become available in various process stages, e.g., in sintering plants, at blast furnaces, at blowing converters, at electric arc furnaces and in rolling mills. The residual materials consist mainly of iron but contain small amounts of zinc, lead and alkalis and are contaminated with oil.

Recycling of the residues from which they derive to the process, e.g., the sintering plant, gives rise to problems because the content in the residues of zinc, lead and alkalis creates problems in the blast furnace process.

A dumping of the residues is becoming more and more difficult for ecological reasons. In addition, a dumping of the residues on a landfill will involve a loss of considerable amounts of iron, zinc and lead. For this reason such residual materials cannot be recycled via the sintering plants unless the content of zinc, lead, alkalis, and oil are decreased before the residues are charged to the sintering plant.

Processes are known in which zinc, lead, and alkalis are volatized under reducing conditions and a considerable part of the iron oxides is reduced to iron metal. When the thus pretreated residual materials are sintered, the iron metal contained therein is re-oxidized in part. Moreover, the iron metal in the mixture being sintered may adversely affect the sintering process.

Other processes are known in which the iron content is reduced no further than to FeO.

German Patent Publication 10 56 157 discloses the treatment of zinc-containing iron oxides in a fluidized bed to produce an exhaust gas which contains zinc as zinc metal and in part as zinc oxide, whereas the iron oxides are oxidized at least as far as to FeO. But to effect a faster removal of zinc, the iron oxides must be reduced to iron metal. The zinc-containing iron ores are charged as pellets having a size of an order of millimeters and the fluidized dust is separated from the exhaust gas in a hot cyclone and is recycled to the fluidized bed. The purified exhaust gas is afterburned, whereby zinc metal is oxidized to ZnO, and the ZnO is separated in dedusters. The reducing gas is fed from below through a gas-feeding zone. A batch operation is described because when the supply of gas has been discontinued the material from which zinc has been removed can be discharged through the gas-feeding tubular port.

French Patent Specification 2,373,612 and "Proceedings Ist Prod. Technol. Conference" Washington, 1980, pages 85 to 103, disclose that zinc and lead can be volatilized without formation of iron metal if no coal is used as a reducing agent. For this reason the carbon contained in metallurgical dusts which contain large amounts of solid carbon, such as blast furnace dusts, is removed before the reducing treatment.

The removal of said carbon may be effected by physical processes or the solid carbon may be almost completely combusted under oxidizing conditions in a preceding separate stage. The material is treated on traveling grates or in shaft furnaces.

A separate process stage is required to remove the solid carbon and part of the heat generated by the combustion of the solid carbon is lost for the process.

Published German Patent Application 39 42 337 discloses the reprocessing of residual metallurgical materials which contain zinc and lead by a thermal treatment in a circulating fluidized bed at elevated temperatures and under reducing conditions in a process in which zinc and lead are volatilized, higher oxides of iron are reduced no further than to FeO, vaporized lead and zinc are separated from the exhaust gas after it has been cooled, and a reducing fluidizing gas which is virtually free of free oxygen is fed to the lower part of the fluidized bed reactor of the circulating fluidized bed system. A solid carbon content of 5 to 30% is maintained in the lower portion of the fluidized bed. The reduction potential in the lower part of the fluidized bed reactor is so adjusted by the selection of the rate and composition of the fluidizing gas that at least 80% of the iron content are present as $Fe^{2+}$, up to 1% is present as iron metal, and the balance is present as $Fe^{3+}$.

Oxygen-containing gases are fed to the upper portion of the fluidized bed reactor. Solid carbon is combusted to generate most of the heat that is required but $CO_2$ is formed only in such an amount that zinc metal is not re-oxidized. The suspension discharged from the upper part of the fluidized bed reactor is fed to the recycle cyclone of the circulating fluidized bed. Substantially all solids are removed there from said suspension.

Separated solids are recycled into the fluidized bed reactor in such a manner that the amount of solids which are circulated per hour in the circulating fluidized bed is at least 5 times the weight of the solids contained in the fluidized bed reactor. The gas leaving the recycle cyclone is cooled to a temperature at which zinc metal is oxidized to ZnO. The dustlike compounds of zinc and lead are separated from the gas.

That process has the advantage that a major part of the heat required for the process can be generated by a direct combustion of solid coal in the fluidized bed and a substantially complete removal of zinc is nevertheless effected so that the residues can be processed in a highly economical manner.

OBJECT OF THE INVENTION

It is therefore an object of the present invention to provide an improved process for the purposes described wherein the heat which is required for the process can completely be generated from solid carbonaceous materials.

SUMMARY OF THE INVENTION

That object is accomplished in accordance with the invention in that residual metallurgical materials (metallurgical residues as defined previously) which contain zinc and lead are reprocessed by a thermal treatment in a circulating fluidized bed at elevated temperatures and under reducing conditions in a process in which zinc and lead are volatilized. Higher oxides of iron are reduced no further than to FeO. Vaporized lead and zinc are separated from the exhaust gas after it has been cooled. A fluidized gas is fed to the lower part of the fluidized bed reactor of the circulating fluidized bed system. A solid carbon content of 5 to 30% is adjusted in the lower portion of the fluidized bed. The reduction potential in the lower part of the fluidized bed reactor is so adjusted by the amount and composition of the fluidizing gas that at least 80% of the iron content are present as $Fe^{2+}$, up to 1% is present as metallic iron and the balance is present as $Fe^{3+}$. Oxygen-containing gases are fed to the upper portion of the fluidized bed reactor. Solid carbonaceous material is fed to the lower part of the fluidized bed reactor below the location at which the oxygen-containing gases are fed, but $CO_2$ is formed only in such an amount that metallic zinc is not re-oxidized. The suspension discharged from the upper part of the fluidized bed reactor is fed to the recycle cyclone of the circulating fluidized bed. Substantially all solids are removed there from said suspension. Separated solids are recycled into the fluidized bed reactor in such a manner that the amount of solids which are circulated per hour in the circulating fluidized bed is at least 5 times the weight of the solids contained in the fluidized bed reactor. The gas leaving the recycle cyclone is cooled to a temperature at which metallic zinc is oxidized to ZnO. The dustlike compounds of zinc and lead are separated from the gas.

According to the invention, air is blown as a fluidizing gas into the fluidized bed reactor in such an amount that the air contains 10 to 50% of the required oxygen, the remaining oxygen is supplied in the secondary gas, solid carbonaceous materials having high and low reactivities, respectively, are fed to the lower part of the fluidized bed reactor below the location at which the oxygen-containing secondary gas is fed, up to 20% of the carbonaceous material fed to the lower part of the fluidized bed reactor consists of carbonaceous material having a low reactivity, and the amount of the solid carbonaceous material which is added is so adjusted that by a predominant combustion of the carbonaceous material having a high reactivity at a $CO/CO_2$ ratio of 0.5 to 1.5 a temperature of 900° to 1100° C. is obtained.

Alternatively, in accordance with the invention, metallurgical residues which contain zinc and lead are reprocessed by a thermal treatment in a circulating fluidized bed at elevated temperatures and under reducing conditions in a process in which zinc and lead are volatilized, higher oxides of iron are reduced no further than to FeO, vaporized lead and zinc are separated from the exhaust gas after it has been cooled, a reducing fluidizing gas which is virtually free of oxygen is fed to the lower part of the fluidized bed reactor of the circulating fluidized bed system, and a solid carbon content of 5 to 30% is adjusted in the lower portion of the fluidized bed. The reduction potential in the lower part of the fluidized bed reactor is so adjusted by the amount and composition of the fluidizing gas that at least 80% of the iron content are present as $Fe^{2+}$, up to 1% is present as metallic iron, and the balance is present as $Fe^{3+}$. Oxygen-containing gases are fed to the upper portion of the fluidized bed reactor. Solid carbon is combusted to generate most of the heat that is required but $CO_2$ is formed only in such an amount that metallic zinc is not re-oxidized. The suspension discharged from the upper part of the fluidized bed reactor is fed to the recycle cyclone of the circulating fluidized bed. Substantially all solids are removed there from said suspension. Separated solids are recycled into the fluidized bed reactor in such a manner that the amount of solids which are circulated per hour in the circulating fluidized bed is at least 5 times the weight of the solids contained in the fluidized bed reactor. The gas leaving the recycle cyclone is cooled to a temperature at which metallic zinc is oxidized to ZnO, and the dustlike compounds of zinc and lead are separated from the gas.

According to this aspect of the invention, solid carbonaceous materials having high and low reactivities, respectively, are fed to the lower part of the fluidized bed reactor below the location at which the oxygen-containing secondary gas is fed, up to 20% of the carbonaceous material fed to the lower part of the fluidized bed reactor consists of carbonaceous material having a low reactivity, and the amount of the solid carbonaceous material which is added is so adjusted that by a predominant combustion of the carbonaceous material having a high reactivity and at a $CO/CO_2$ ratio of 0.5 to 1.5 a temperature of 900° to 1100° C. is obtained. A major part of the exhaust gas after a removal of water vapor and $CO_2$ is recirculated as a fluidizing gas, and an oxygen-containing gas containing more than 50% by volume oxygen is fed as a fluidizing gas. Part of the exhaust gas must be removed and withdrawn and may be used to heat the scrubber for removing $CO_2$.

The secondary gas may consist of air, oxygen-enriched air or oxygen. Secondary gas and fluidizing air are preferably preheated before they are fed. Carbonaceous material having a low reactivity consists of outgassed or low-gas coals which contain less than 10% volatile constituents, such as coke, coke breeze, petroleum coke. From the exhaust gas which is recirculated as a fluidizing gas, water vapor and $CO_2$ are removed to the highest degree which makes sense from a technical point of view.

The metallurgical residues may particularly consist of blast furnace top gas dusts, converter dusts and electric furnace dusts, which become available in the making of iron and steel.

In the treatment of residual materials from the electrolytic production of zinc, residual jarosite must be treated to decompose the sulfate before the residual materials are treated. The residual materials to be treated may have a particle size up to about 3 mm.

The lower zone of the fluidized bed in the fluidized bed reactor is operated under more strongly reducing conditions than the upper zone. The upper zone extends to up to 30% of the height of the fluidized bed reactor. A solid carbon content of 5 to 30% is adjusted in the fluidized bed in the lower zone. Up to 80% or more of any metallic iron which is contained in the feed and enters the upper zone will be oxidized to $Fe^{2+}$, the remainder will be oxidized to $Fe^{3+}$ and up to 1% will be left as metallic iron and will act as a fuel. A temperature of 1000° to 1050° C. is preferably maintained in the fluidized bed reactor. The average solids density amounts to 300 to 600 kg/m$^3$ in the lower zone and to 5 to 50 kg/m$^3$ in the upper zone. The residual metallurgical materials are preferably fed to the upper zone.

Part of the heat which is required is generated by the combustion of reducing gas. Part may be generated by the combustion of iron metal, provided that the feed contains iron metal. In addition to zinc and lead, alkalis and, e.g., chlorine are volatilized.

Any oil which is contained in the feed will be vaporized and will act as a fuel.

The solids are continuously withdrawn from the lower part of the fluidized bed reactor or from the recycle line. The gas leaving the recycle cyclone is cooled by an injection of water and/or by an indirect heat exchange.

The temperature required for the reoxidation of iron metal will depend on the CO content of the mixture of $CO/CO_2$.

The circulating fluidized bed system consists of a fluidized bed reactor, a recycle cyclone, and a recycle line for the solids separated in the recycle cyclone. The term "recycle cyclone" includes one recycle cyclone and a plurality of recycle cyclones having parallel paths.

Whereas in an "orthodox" fluidized bed a dense phase is separated by a distinct density step from the overlying gas space, the fluidized bed system utilized for the invention distinguishes in that states of distribution without a defined boundary layer are present in the fluidized bed reactor. There is no density step between the dense phase and the overlying dust space but the concentration of the residual materials in the reactor decreases continuously from bottom to top.

The following ranges will be determined if the operating conditions are defined by the Froude and Archimedes numbers:

$$0.1 \leq 3/4 \times Fr^2 \times \frac{g}{\rho_k - \rho_g} \leq 10$$

and $$0.01 \leq Ar \leq 100$$

wherein $$Ar = \frac{d_k^3 \times g \times (\rho_k - \rho_g)}{\rho_g \times \gamma^2} \text{ and}$$

$$Fr^2 = \frac{u^2}{g \times d_k}$$

and u=relative gas velocity in m/s,
Ar=Archimedes number
Fr=Froude number
$\rho g$=density of gas in kg/m³
$\rho k$=density of solid particle in kg/m³
dk=diameter of spherical particle in m
Y=kinematic viscosity in m²/s
g=constant of gravitation in m/s²

The advantage afforded by the invention is that the process is not dependent on external gas sources for the reducing gas. The availability of gas having the lowest possible $CH_4$ content is highly restricted. $CH_4$ has a low reactivity.

According to a preferred further feature a part of the carbonaceous material having a high reactivity which is used has a particle size below 10 mm and the carbonaceous material having a low reactivity which is used has a particle size below 2 mm. The use of these particle sizes gives particularly good results and eliminates the need for a further reduction in size of the carbonaceous material having a high reactivity because that material is decomposed in the fluidized bed.

A further preferred features resides in that a part of the carbonaceous material has a particle size below 1 mm and is mixed with the residual materials, the amount of carbonaceous material which is added is not in excess of 10% by weight of the mixture, and the mixture is subjected to a micro-agglomeration. For the agglomeration the mixture must be adjusted to a water content of about 10 to 17% by weight and water must be added during the agglomeration. If the material has inherently a high water content, it will be adjusted to the desired water content by the addition of the carbonaceous material. It is preferably to use a carbonaceous material which has a low reactivity so that the formation of iron metal will be avoided.

According to a further feature, oil-containing fine-grained roll scale is added. The roll scale may be added separately or in a mixture with the residual materials. The roll scale can thus be disposed of in a simple and economical manner.

BRIEF DESCRIPTION OF THE DRAWING

The above and other objects, features, and advantages will become more readily apparent from the following description, reference being made to the accompanying drawing, the sole figure of which is a flow diagram illustrating the invention.

SPECIFIC DESCRIPTION AND EXAMPLE

The circulating fluidized bed system consists of a fluidized bed reactor 1, a recycle cyclone 2, and a recycle line 3. After a treatment in a microagglomerating unit 4, the residual metallurgical materials are fed through line 5 to the fluidized bed reactor 1, which is fed with coal through line 6. Air is supplied through line 7 to an indirect heat exchanger 8 and is preheated therein and then supplied as a fluidizing gas to the fluidized bed reactor through line 9.

Air is supplied through line 10 to an indirect heat exchanger 11 and is preheated therein and then supplied as a secondary gas through line 12 to the fluidized bed reactor 1.

The lower zone of the fluidized bed in the fluidized bed reactor 1 is operated under more strongly reducing conditions and extends approximately as far as to the inlet 12 for the secondary gas.

The gas-solids suspension discharged from the fluidized bed reactor 1 is treated in the recycle cyclone 2 to remove substantially all solids. The separated solids are recycled through the recycle line 3 to the fluidized bed reactor 1.

The gas from the recycle cyclone 2 is fed through line 13 to a separating cyclone 14 and is subsequently supplied through line 15 to an evaporate cooler 16, which is supplied with water, which is injected from line 17.

The gas is conducted from the evaporative cooler 16 through line 18 to a filter 19 and is conducted from the latter through line 20 to the exhaust gas collecting system.

The zinc- and lead- containing dust which has been separated in the evaporative cooler 16 and in the filter 19 is discharged through line 21 to means for further processing. Solids from the fluidized bed reactor 1 are supplied through line 22 and the solids separated in the separating cyclone 14 are conducted through line 23 to a cooler 24 and from the latter are supplied through line 25 to a sintering plant.

EXAMPLE

A mixture of blast furnace top gas sludge, converter dust, and dust collected in an electrostatic precipitator following a sintering plant was granulated in a granulator to form microgranules having a particle size of 0.1 to 3 mm. The water content was 16.3% by weight.

In the circulating fluidized bed system the fluidized bed reactor had a height of 15 meters and was 2.6 meters in diameter. It was charged with microgranules at a rate of 13,500 kg/h and with coals at a rate of 6,200 kg/h, which consisted of 10% coke breeze and 90% long-flame gas coal that contained 30% volatile constituents. Air at 600° C. was supplied as a fluidizing gas at a rate of 13,000 sm³/h (sm³=standard cubic meter). Air at 700° C. was supplied as a secondary gas at a rate of 12,000 sm³/h. The temperature in the fluidized bed reactor was 1020° C.

Exhaust gas at a rate of 39,350 sm³/h left the separating cyclone and contained 11% CO, 9% $CO_2$, 10% $H_2$, 15% $H_2O$, and 54% $N_2$. 18,000 kg water per hour were injected into the evaporative cooler. The gas leaving the evaporative cooler was at 220° C. Exhaust gas left the filter at a rate of 62,900 sm³/h.

Dust was separated in the evaporative cooler and the filter at a rate of 2300 kg/h and contained 22% Zn+Pb, 20% C, 34% FeO, and 10% $Fe_2O_3$. Solids at a rate of 23,200 kg/h were withdrawn from the fluidized bed reactor and the separating cyclone and contained 0.3% Zn and 9.1% C.

We claim:

1. A process for thermally treating a residual metallurgical material which contains zinc, lead and iron, in a circulating fluidized bed at elevated temperature and under reducing conditions, which comprises the steps of:

(a) feeding a residual metallurgical material which contains zinc, lead and iron into an upper part of a fluidized bed reactor comprising an upper part and a lower part, said lower part having a height of up to 30% of the height of said reactor;

(b) blowing primary air as a fluidizing gas into the lower part of the fluidized bed reactor in such an amount that said primary air contains 10 to 50% of the oxygen required for combustion;

(c) feeding secondary air into the upper part of the fluidized bed reactor to provide the balance of the oxygen required for combustion;

(d) introducing a first and a second solid carbonaceous material having particle sizes below 2 mm and 10 mm, respectively, into the lower part of the fluidized bed reactor below a location at which the secondary air is fed, wherein the amount of the first carbonaceous material being about 10 to 20% by weight of the sum of both carbonaceous materials, said first material having a low reactivity and being selected from the group consisting of coke, coke breeze, and petroleum coke, said second carbonaceous material being low flame gas coal and having a high reactivity, the solid carbon content in said lower part of the reactor being 5 to 30% wherein all heat required for combusting the residual metallurgical material is generated from the solid carbonaceous materials, and combusting the solid carbonaceous materials in the reactor and by a predominant combustion of the second carbonaceous material at a $CO/CO_2$ ratio of 0.5 to 1.5, a temperature of 900° to 1100° C. is obtained, and during the combustion $CO_2$ is formed only in such an amount that any metallic zinc contained in the residual metallurgical materials is not reoxidized;

(e) adjusting a reduction potential in the lower part of the fluidized bed reactor by regulating an amount of the primary air so that at least 80% of the iron content in the residual metallurgical material fed according to step (a) into the upper zone is present as $Fe^{2+}$, up to 1% is present as metallic iron, and the balance is present as $Fe^{3+}$;

(f) reducing volatilized lead and zinc contained in the residual metallurgical material in the fluidized bed reactor to form metallic lead and zinc and reducing higher oxides of iron no further than to FeO, forming a gas-solids suspension in the upper part of the reactor;

(g) removing the gas-solids suspension from the upper part of the fluidized bed reactor, separating substantially all solids from the gas-solids suspension in a cyclone, returning the separated solids to the fluidized bed reactor, and obtaining an exhaust gas containing metallic lead and zinc, the amount of solids which are returned per hour from the cyclone to the reactor is at least 5 times the weight of the solids contained in the reactor;

(h) cooling the exhaust gas containing metallic lead and zinc in an evaporative cooler by injecting water into said cooler, thereby cooling the exhaust gas to oxidize the metallic zinc to ZnO as well as forming lead compounds; and (i) separating the ZnO and the compounds of lead in the form of dust from the exhaust gas.

2. The process defined in claim 1 wherein according to step (d) a part of the solid carbonaceous materials has a particle size below 1 mm and is mixed with the residual metallurgical material.

3. The process defined in claim 1 wherein oil-containing fine-grained roll scale is added to the residual metallurgical material.

4. A process for thermally treating a residual metallurgical material which contains zinc, lead and iron, in a circulating fluidized bed at elevated temperature and under reducing conditions, which comprises the steps of:

(a) feeding a residual metallurgical material which contains zinc, lead and iron into an upper part of a fluidized bed reactor comprising an upper part and a lower part, said lower part having a height of up to 30% of the height of said reactor;

(b) blowing a reducing fluidizing gas into the lower part of the fluidized bed reactor;

(c) feeding an oxygen-containing gas into the upper part of the fluidized bed reactor to provide the oxygen required for combustion, said oxygen-containing gas containing more than 50% by volume of oxygen;

(d) introducing a first and a second solid carbonaceous material having particle sizes below 2 mm and 10 mm, respectively, into the lower part of the fluidized bed reactor below a location at which the oxygen-containing gas is fed, wherein the amount of the first carbonaceous material being about 10 to 20% by weight of the sum of both carbonaceous materials, said first material having a low reactivity and being selected from the group consisting of coke, coke breeze, and petroleum coke, said second carbonaceous material being low flame gas coal and having a high reactivity, the solid carbon content in said lower part of the reactor being 5 to 30% wherein all heat required for combusting the residual metallurgical material is generated from the solid carbonaceous materials, and combusting the solid carbonaceous materials in the reactor and by a predominant combustion of the second carbonaceous material at a $CO/CO_2$ ratio of 0.5 to 1.5, a temperature of 900° to 1100° C. is obtained, and during the combustion $CO_2$ is formed only in such an amount that any metallic zinc contained in the residual metallurgical materials is not reoxidized;

(e) adjusting a reduction potential in the lower part of the fluidized bed reactor by regulating an amount of the reducing fluidizing gas so that at least 80% of the iron content in the residual metallurgical material fed according to step (a) into the upper zone is present as $Fe^{2+}$, up to 1% is present as metallic iron, and the balance is present as $Fe^{3+}$;

(f) reducing volatilized lead and zinc contained in the residual metallurgical material in the fluidized bed reactor to form metallic lead and zinc and reducing higher oxides of iron no further than to FeO, forming a gas-solids suspension in the upper part of the reactor;

(g) removing the gas-solids suspension from the upper part of the fluidized bed reactor, separating substantially all solids from the gas-solids suspension in a cyclone, returning the separated solids to the fluidized bed reactor, and obtaining an exhaust gas containing metallic lead and zinc, the amount of solids which are returned per hour from the cyclone to the reactor is at least 5 times the weight of the solids contained in the reactor;

(h) cooling the exhaust gas containing metallic lead and zinc in an evaporative cooler by injecting water into said cooler, thereby cooling the exhaust gas to oxidize the metallic zinc to ZnO as well as forming lead compounds;

(i) separating the ZnO and the compounds of lead in the form of dust from the exhaust gas; and (j) from a major part of the exhaust gas removing water vapor and $CO_2$ and recirculating said exhaust gas into the reactor as said reducing fluidizing gas.

5. The process defined in claim 4 wherein according to step (d) a part of the solid carbonaceous materials has a particle size below 1 mm and is mixed with the residual metallurgical material.

6. The process defined in claim 4 wherein oil-containing fine-grained roll scale is added to the residual metallurgical material.

* * * * *